_(12)_ United States Patent
Yun

(10) Patent No.: US 9,627,920 B2
(45) Date of Patent: Apr. 18, 2017

(54) BATTERY PACK AND CHARGING METHOD THEREOF

(71) Applicant: Samsung SDI Co., Ltd., Yongin-si, Gyeonggi-do (KR)

(72) Inventor: Junho Yun, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1031 days.

(21) Appl. No.: 13/868,439

(22) Filed: Apr. 23, 2013

(65) Prior Publication Data

US 2014/0203781 A1  Jul. 24, 2014

(30) Foreign Application Priority Data

Jan. 22, 2013 (KR) ......................... 10-2013-0007082

(51) Int. Cl.
*H02J 7/00* (2006.01)
*H02J 7/04* (2006.01)

(52) U.S. Cl.
CPC ............ *H02J 7/042* (2013.01); *H02J 7/0077* (2013.01)

(58) Field of Classification Search
USPC ....................................................... 320/112
See application file for complete search history.

(56) References Cited

U.S. PATENT DOCUMENTS

| 7,091,695 | B2 * | 8/2006 | Miyazaki | H02J 7/0026 320/116 |
| 7,095,211 | B2 * | 8/2006 | Denning | G01R 31/3648 320/132 |
| 7,855,906 | B2 * | 12/2010 | Klodowski | H02M 7/48 363/97 |
| 7,888,945 | B2 * | 2/2011 | Miyazaki | H02J 7/0026 320/116 |
| 8,259,479 | B2 * | 9/2012 | Wagoner | H02J 3/38 363/131 |
| 2001/0022518 | A1 * | 9/2001 | Asakura | G01R 31/3679 324/426 |
| 2002/0097022 | A1 | 7/2002 | Saeki et al. | |
| 2009/0027932 | A1 * | 1/2009 | Haines | H02J 9/062 363/95 |
| 2011/0127949 | A1 | 6/2011 | Taki | |

FOREIGN PATENT DOCUMENTS

| JP | 2002-218668 (A) | 8/2002 |
| JP | 2005-294141 (A) | 10/2005 |
| JP | 2011-120316 (A) | 6/2011 |

* cited by examiner

*Primary Examiner* — Yalkew Fantu
(74) *Attorney, Agent, or Firm* — Knobbe Martens Olson & Bear LLP

(57) ABSTRACT

A charging method of a battery and a battery pack thereof are described. A fully charged amount of the battery cell is changed upon comparing the charge amount of the battery to a reference capacity. If the battery cell is fully charged, charging of the battery cell may be interrupted and a counter incremented. The charged amount of the battery cell is compared to a reference capacity, and if the charged amount of the battery cell is equal to the first reference capacity, the fully charged amount of the battery cell may be set to another reference capacity, and the battery discharged the battery cell down to the new reference capacity.

19 Claims, 4 Drawing Sheets

BATTERY PACK AND CHARGING METHOD THEREOF

CROSS-REFERENCE TO RELATED APPLICATIONS

This application claims the benefit of Korean Patent Application No. 10-2013-0007082 filed on Jan. 22, 2013, the contents of which are incorporated herein by reference in their entirety.

BACKGROUND

Field

The present disclosure relates to a charging method of a battery and a battery pack thereof.

Description of the Related Technology

In portable electronic devices, such as mobile phones, smart phones, or notebook computers, functionality has become complicated, and the amount of data used has increased. Power consumption has correspondingly increased. Users of mobile devices desire a long battery life which can provide extended operation when used in a mobile environment. Recently, lithium ion batteries having high energy density have primarily been used as the power source for portable electronic devices, and are generally in the form of a battery pack having one or more battery cells within a housing.

When a lithium ion battery is charged or discharged, it is necessary to accurately control charge/discharge voltages and charge/discharge currents. To this end, a microprocessor is generally installed in the battery pack which is able to sense the internal state of the battery pack during charging or discharging, and transmit information concerning the internal state of the battery pack to a main body of an electronic device or to drive a protection circuit.

SUMMARY OF CERTAIN INVENTIVE ASPECTS

Aspects of the present disclosure include a method for charging a battery, which can improve a lifetime characteristic of a battery cell by resetting a fully charged amount of the battery cell when the battery cell is used in a state in which it is maintained with the fully charged amount.

Aspects of the present disclosure further include charging method of a battery, which can improve a lifetime characteristic of a battery cell by intentionally discharging the battery cell when the battery cell is used in a state in which it is maintained with the fully charged amount. Aspects of the present disclosure include a battery pack having the above-described features Some aspects described herein include a method for charging a battery comprising determining whether a battery cell is fully charged; if the battery cell is fully charged, interrupting charging of the battery cell; determining whether the charged amount of the battery cell is equal to a first reference capacity; if the charged amount of the battery cell is equal to first reference capacity, incrementing a stored number of interrupted charging counts; determining whether the number of interrupted charging counts is equal to a preset number; if the number of interrupted charging counts is equal to the preset number, setting a fully charged amount of the battery cell to a second reference capacity; and discharging the battery cell down to the second reference capacity.

In some embodiments, the second reference capacity is set to be less than the first reference capacity.

In some embodiments, the method further comprises after discharging the battery cell until the charged amount of the battery cell reaches the second reference capacity, stopping discharging the battery cell; determining whether the charged amount of the battery cell is equal to a third reference capacity; if the charged amount of the battery cell is equal to the third reference capacity, determining whether the battery cell is chargeable; if the battery cell is chargeable, charging the battery cell to reach the second reference capacity; determining whether the charged amount of the battery cell is equal to the second reference capacity; and if the charged amount of the battery cell is equal to the second reference capacity, interrupting charging of the battery cell.

In some embodiments, the third reference capacity is less than the second reference capacity.

In some embodiments, the preset number is in a range from 3 to 10.

In some embodiments, discharging the battery cell comprises connecting the battery cell to an external electronic device.

In some embodiments, while the battery cell is being charged, the external electronic device, the battery cell and an AC adapter are electrically connected to each other, and while the battery cell is forcibly discharged, the AC adapter is electrically disconnected from the external electronic device and the battery cell.

In some embodiments, discharging the battery cell comprises connecting the battery cell to a resistor.

In some embodiments, a difference between the fully charged amount of the battery cell and the first reference capacity is equal to a difference between the second reference capacity and the third reference capacity.

Some aspects of the present disclosure include a battery pack comprising a battery cell; a voltage sensor; a current sensor, wherein the voltage sensor and the current sensor are configured to measure a charged amount of the battery cell; and a controller controlling charging of the battery cell, wherein if the battery cell is reduced to a first reference capacity, the controller is configured to interrupt charging of the battery cell and increment a stored number of interrupted charging counts, and if the number of interrupted charging counts is equal to a preset number, the controller is configured to set the fully charged amount of the battery cell to a second reference capacity, and discharge the battery cell down to the second reference capacity.

In some embodiments, the second reference capacity is set to be less than the first reference capacity.

In some embodiments, after the battery cell is discharged down to the second reference capacity, the controller is configured to interrupt discharging of the battery cell, and wherein if the charged amount of the battery cell is reduced to a third reference capacity the battery cell is charged to reach the second reference capacity.

In some embodiments, the third reference capacity is set to be less than the second reference capacity.

In some embodiments, the measured charged amount of the battery cell is equal to the second reference capacity, the controller is configured to interrupt charging of the battery cell and lower the charged amount to the third reference capacity.

In some embodiments, the preset number is in a range of 3 to 10.

In some embodiments, the controller forcibly discharges the battery cell by connecting the battery cell to an external electronic device.

In some embodiments, while the battery cell is being charged, the external electronic device, the battery cell and an AC adapter are electrically connected to each other, and the controller is configured to discharge the battery cell by transmitting a signal to the external electronic device to electrically disconnect the external electronic device and the AC adapter from each other.

In some embodiments, the controller is configured to connect the battery cell to a resistor.

In some embodiments, a difference between the fully charged amount of the battery cell and the first reference capacity is equal to a difference between the second reference capacity and the third reference capacity.

In the charging method of a battery according to one embodiment, a lifetime characteristic of a battery cell can be improved by resetting a fully charged amount of the battery cell when the battery cell is used in a state in which it is maintained with the fully charged amount.

In some embodiments, a battery cell can be rapidly changed to a charging cycle to be adapted to a reset fully charging condition by forcibly discharging the battery cell when the battery cell is used in a state in which it is maintained with the fully charged amount.

Additional aspects and/or advantages of the present disclosure will be set forth in part in the description which follows and in part will be understood by those of skill in the art from the description or may be learned by practice of the invention.

BRIEF DESCRIPTION OF THE DRAWINGS

The aspects, features and advantages of the present invention will be more apparent from the following detailed description in conjunction with the accompanying drawings, in which.

DETAILED DESCRIPTION

Example embodiments of the present invention will now be described in more detail with reference to accompanying drawings, such that those skilled in the art can easily practice the present invention.

As used herein, the term "and/or" includes any and all combinations of one or more of the associated listed items.

In addition, the terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification, terms "first reference capacity," "second reference capacity" and "third reference capacity" are used to describe particular aspects, but are not limited thereto. These terms are used only to distinguish one value from other values.

Figure 1:
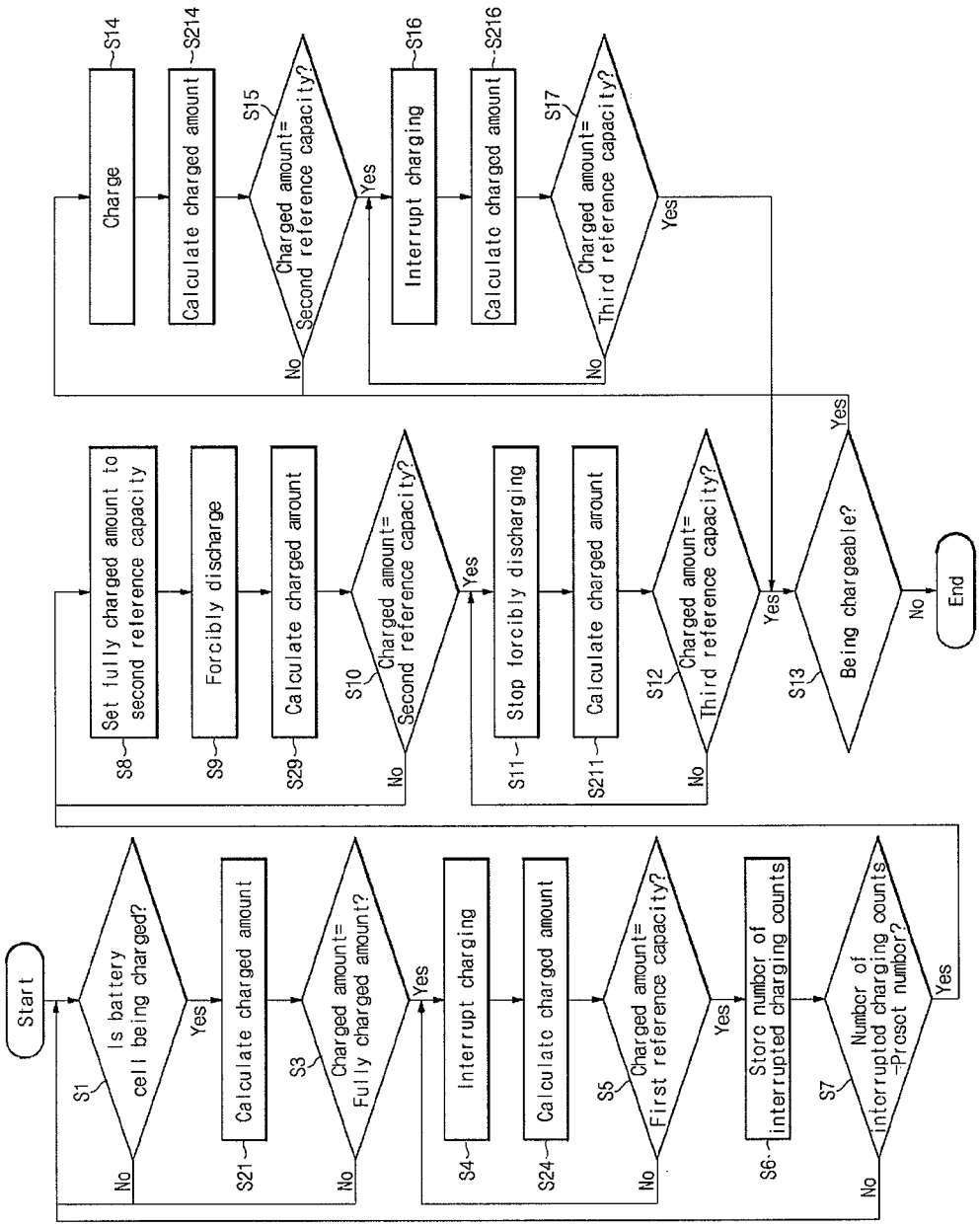
FIG. 1 is a flowchart illustrating a charging method of a battery.
Figure 2:
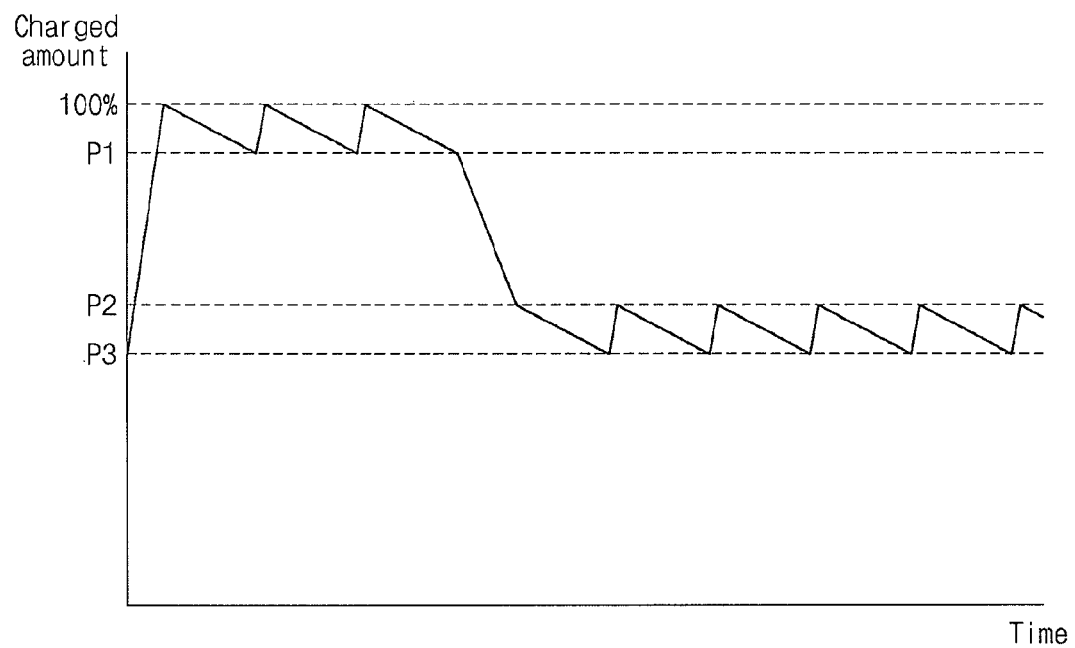
FIG. 2 is a graph illustrating a charged amount of a battery.

FIG. 1 is a flowchart illustrating a charging method of a battery and FIG. 2 is a graph illustrating a charged amount of a battery. Referring to FIG. 1, the charging method of a battery includes determining whether a battery cell is charged (S1), calculating a charged amount (S2), determining whether the battery cell is fully charged (100%) (S3), interrupting charging (S4), determining whether the charged amount is equal to first reference capacity (S5), storing the number of interrupted charging counts (S6), determining whether the number of interrupted charging counts is equal to a preset number (S7), setting the fully charged amount to second reference capacity (S8), forcibly discharging the battery cell down to the second reference capacity (S9), determining whether the charged amount is equal to the second reference capacity (S10), stopping forcibly discharging the battery cell (S11), determining whether the charged amount is equal to third reference capacity (S12), determining whether the battery cell is chargeable (S13), Charging (S14), determining whether the charged amount is equal to the second reference capacity (S15), interrupting charging (S16), and determining whether the charged amount is equal to the third reference capacity (S17).

The process of FIG. 1 starts with a battery cell connected to an external electronic device which includes a power supply unit. In decision state S1, it is determined whether the battery cell is being charged. This determination may be performed based on information obtained through a voltage sensor or a current sensor installed within the battery pack, or via a data line connected between the battery pack and the external electronic device. In some embodiments, charging may be determined or confirmed if the voltage sensor senses that voltage of the battery cell is increasing. in some embodiments, charging may be determined or confirmed the current sensor senses that a charging current is supplied, or, in some embodiments, if a signal notifying that the battery cell is being charged is transmitted from the external electronic device through the data line. If the battery is not being charged, the process returns to the beginning, and decision state S1 is performed as described above. If it is determined that the battery cell is being charged, the process moves to step S21, wherein the amount charged is calculated.

In step S21, the charged amount of the battery cell is calculated. The calculating of the charged amount may be performed based on the information obtained from the voltage sensor or the current sensor as described elsewhere herein. For example, when the voltage sensor is used, the charged amount may be calculated based on the current voltage of the battery cell. In some embodiments, data about the relationship between the voltage and the capacity of the battery cell may be prepared in advance, and may be used to determine the amount charged. In some embodiments, such as when the current sensor is used, the charged amount may be calculated based on the amount of the current having passed through the current sensor. In some embodiments, both the voltage and the current sensors may be used to determine the amount charged. The amount charged as detected by the voltage sensor may be compared to the amount charged as determined by the current sensor. The two values for amount charged may be averaged, or the lowest or highest selected, as desired.

The process then moves to decision state S3, wherein it is determined whether the battery cell is fully charged. The determining may be performed based on information obtained through a voltage sensor or a current sensor installed within the battery pack. For example, in some embodiments, such as in a case where the voltage sensor is used, it may be determined that the battery cell is fully charged when the battery cell has a voltage of approximately 4.2 V. This value is provided only for illustration, and one of skill in the art would understand that aspects of the present disclosure are not limited thereto. In some embodiments, such as in a case where the current sensor is used, it may be determined that the battery cell is fully charged when the amount of accumulated current having passed through the current sensor exceeds a preset amount of accumulated current.

If the battery is not determined not to be fully charged, the process returns to the start, and proceeds to decision state S1 as described above. If the battery is determined to be fully charged, the process next moves to step S4, wherein charging is interrupted. In some embodiments, the charge may be interrupted by turning off a charge switch installed between a positive electrode terminal of the battery cell and a positive electrode terminal of the battery pack, thereby preventing the battery cell from being over-charged. Since the charged amount of the battery cell has already reached a fully charged amount (100%) in decision state S3, interrupting the charging current in step S4 prevents over-charging of the battery cell. Thus, the battery cell is placed into a state where the battery slowly self-discharges, and the battery's state of charge is slowly reduced.

In step S24, similar to step S21 as described above, the charged amount of the battery cell is calculated. As calculating the charge amount is similar in each instance, repeated explanations will be omitted.

The process moves to decision state S5, wherein it is determined whether the charged amount calculated in step S24 is equal to first reference capacity P1. In some embodiments, the first reference capacity P1 means a charged amount of approximately 95%, or a 95% state of charge. Since the battery cell is prevented from being over-charged in step S4, it is desirable to maintain the charged amount of the battery cell at approximately 100%. In some embodiments, the charged amount of the battery cell is maintained at approximately 98%, 95%, 90%, any valued therebetween, or any other desired value, and the battery cell is not discharged more than is necessary. The numerical value provided herein is only for illustration, and aspects of the present development are not limited thereto.

If the charged amount is not equal to the first reference capacity, the process returns to step S4 as described herein. If it is determined that the calculated charged amount is equal to the first reference capacity P1, the process moves to step S6, wherein the number of interrupted charging counts is stored.

In step S6, when the battery cell is self-discharged to first reference capacity P1 at a fully charged state (e.g., 100%, 95%, etc.), a counter counts the interrupted charging process, and increments the number of interrupted charging counts by 1, and the incremented number of interrupted charging counts is stored in the controller in the battery pack or in the mobile electronic device.

The process next moves to decision state S7, wherein it is determined whether the number of interrupted charging counts is equal to a preset number. In some embodiments, decision state S7 is performed to determine whether charging and discharging cycles are repeatedly performed when the battery cell is at an almost fully charged state (100%). In some embodiments, decision state S7 determines whether a user uses the external electronic device by directly connecting the same to an AC power source.

In some embodiments, the preset number of interrupted charging counts may preferably be set to approximately 3 to 10. If the number of interrupted charging counts is less than or equal to 3, that is, if the number of charging and discharging cycles repeatedly performed is less than or equal to 3, the reliability in determining that the user uses the external electronic device by directly connecting the same to the AC power source is reduced. If the number of interrupted charging counts is greater than or equal to 10, charging and discharging cycles are performed more frequently than is necessary, thereby reducing the useful life of the battery cell.

As described above, whether the user uses the external electronic device connected to an AC power source is determined based on the number of interrupted charging counts. A person of skill in the art will understand that this method is provided only for illustration. For example, in some embodiments, it may also be determined based on the number of charging cycles of the battery cell that the user uses the external electronic device by directly connecting the same to the AC power source.

If the number of interrupted charging counts is not equal to the preset number, the process returns to the beginning, and steps S1 to S7 are again performed. If the number of interrupted charging counts is equal to the present number, the process moves to step 8, wherein the fully charged amount of the battery cell is set to a second reference capacity P2. In some embodiments, the second reference capacity P2 is set to approximately 70%, in which the lifetime characteristic of the battery cell can be maintained by preventing the battery cell from deteriorating even when the user uses the external electronic device by directly connecting the same to the AC power source. The numerical value provided for P2 is only for illustration, and aspects of the present disclosure are not limited thereto. For example, in some embodiments, the second reference capacity P2 may be greater than 70%, such as 75% or 80%, or less than 70%, such as, 65%, 60%, 55%, 50%, or any other desired value.

The process next moves to step S9, wherein the battery cell is forcibly discharged to reduce the charged amount of the battery cell to the second reference capacity P2. Unlike self-discharging, in the forcibly discharging, the battery cell is forcibly discharged to rapidly reduce the charged amount of the battery cell, and is rapidly changed to a charging cycle adapted to the reset fully charged condition. The process of forcibly discharging the battery cell will be described below.

Next, the process moves to step S29, wherein the charged amount is calculated as described above with regard to step S21.

The process next moves to decision state S10, wherein it is determined whether the charged amount calculated in step S29 is equal to second reference capacity P2. If the calculated charged amount is not equal to the second reference capacity, the process returns to step S8 and proceeds as described above. If the calculated charged amount is equal to the second reference capacity P2, the process moves to step S11 is performed.

In step S11, the forcibly discharging of the battery cell performed in step S9 is stopped. Since the charging of the battery cell is interrupted, in step S11 the battery cell is put into a state of self-discharge, and the charged amount of the battery cell is slowly reduced, similar to step S4.

Next, in step S211, the charged amount of the battery cell is calculated as described above in step S21.

The process next moves to step S12, wherein it is determined whether the charged amount calculated in step S211 is equal to third reference capacity P3. In some embodiments, the third reference capacity P3 may be a charged amount of approximately 65%. In some embodiments, the third reference capacity P3 may be any value less than the second charging capacity. Since the battery cell is self-discharged in step S11, it is desirable to maintain the charged amount of the battery cell at approximately 70% (the second reference capacity P2), like the first reference capacity P1, and the battery cell is not discharged more than is necessary. Thus, the numerical value provided herein is only for illustration, but aspects of the present invention are not limited thereto.

If the calculated charged amount is equal to the third reference capacity P3, the process proceeds to decision state S13. In decision state S13, it is confirmed whether the battery cell is currently chargeable. As described above, it is determined that the user uses the external electronic device by directly connecting the same to the AC power source to then reset the fully charged amount to the second reference capacity P2. If the battery is not currently chargeable, the process ends. Since the user may interrupt the AC power source, the fully charged amount is set to 100%, and the charging method of the battery according is completed.

If the battery is chargeable, the process proceeds to step S14, wherein the battery cell is charged, which is performed by turning on the charge switch.

The process moves to step S214, wherein the charged amount of the battery cell is calculated, which is the same as step S21. The process next moves to decision state S15, wherein it is determined whether the charged amount calculated in step S214 is equal to the second reference capacity P2, similar to decision state S10. If it is determined that the calculated charged amount is equal to the second reference capacity P2, the process moves to step S16 wherein the charging of the battery cell performed in step S14 is interrupted, similar to step S4, The process moves to decision state S17, it is determined whether the charged amount calculated in step S216 is equal to third reference capacity P3, as in decision state S12. If it is determined whether the calculated charged amount is equal to the third reference capacity P3, the process returns to decision state S13. If it is determined in decision state S13 that the battery cell is continuously chargeable, charging and discharging cycles are continuously performed in a range from the third reference capacity P3 to the second reference capacity P2. If the charged amount is not equal to the third reference capacity P3, the process returns to step 216, and proceeds as described above.

FIG. 2 is a graph depicting the amount charged to a battery according to the process of FIG. 1. The amount charged on the Y axis corresponds to the first, second, and third reference capacity values P1, P2, and P3, respectively, described with reference to FIG. 1.

Figure 3A:
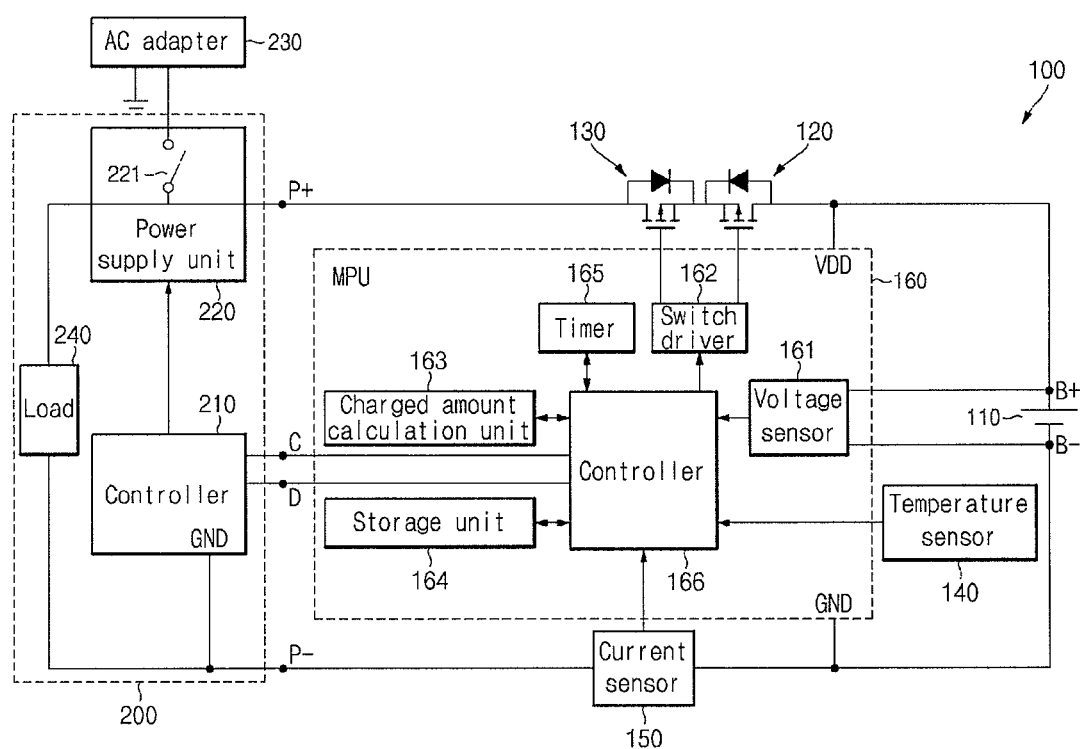
FIG. 3A is a block diagram of an embodiment of a battery pack.

FIG. 3A is a block diagram of a configuration of a battery pack according to an embodiment of the present invention.

As shown in FIG. 3A, the battery pack 100 includes a battery cell 110, a charge switch 120, a discharge switch 130, a temperature sensor 140, a current sensor 150, and a microprocessor unit (MPU) 160. In addition, the battery pack 100 is connected to an external electronic device 200 through pack terminals P+ and P– and communication terminals C and D. Here, the external electronic device 200 may be, for example, a chargeable mobile phone, a smartphone, a tablet computer, a notebook computer or any other mobile electronic device. The external electronic device 200 may comprise a power supply unit 220, which is configured to receive AC power from an AC adapter 230, and charge the battery pack 100.

The battery cell 110 may generally be a rechargeable battery, for example, a lithium ion battery, a lithium ion polymer battery, or any other desired type of battery. The present disclosure does not limit the kind of the battery cell 110 to those listed herein. For example, the battery cell 110 may be a liquid metal battery. In addition, while the battery cell 110 includes a single battery cell in the illustrated embodiment, it may include a plurality of battery cells connected to each other in series or in parallel.

The charge switch 120 may be installed between a positive electrode terminal B+ of the battery cell 110 and a positive electrode terminal P+ of the battery pack. The charge switch 120 is turned off by a control signal of the MPU 160 when the battery cell 110 is over-charged, thereby preventing the battery cell 110 from being over-charged. The charge switch 120 may be generally a metal-oxide semiconductor field-effect transistor (MOSFET) or a relay, and aspects of the present disclosure are not limited thereto.

The discharge switch 130 may also be installed between the positive electrode terminal B+ of the battery cell 110 and the positive electrode terminal P+ of the battery pack. The discharge switch 130 is turned off by a control signal of the MPU 160 when the battery cell 110 is over-discharged, thereby preventing the battery cell 110 from being over-discharged. The discharge switch 130 may be generally an MOSFET or a relay, and aspects of the present disclosure are not limited thereto.

The temperature sensor 140 may be installed directly at the battery cell 110 or around the battery cell 110 and may sense the temperature of the battery cell 110 or the ambient temperature surrounding the battery cell 110, and to transmit the sensed temperature to the MPU 160. The temperature sensor 140 may be, for example, a thermistor, thermocouple, or any other desired temperature sensing device.

The current sensor 150 may be installed between a negative terminal B– of the battery cell 110 and a negative terminal P– of the battery pack. The current sensor 150 may be configured to sense a charge current and a discharge current of the battery cell 110, and transmit the sensed charge or discharge current to the MPU 160. In some embodiments, the current sensor 150 may generally be a sense resistor, and aspects of the present disclosure are not limited thereto.

The MPU 160 includes a voltage sensor 161, a switch driver 162, a charged amount calculation unit 163, a storage unit 164, a timer 165, and a controller 166. The voltage sensor 161 is connected to the battery cell 110 in parallel, and is configured to sense a voltage of the battery cell, convert the sensed voltage into a digital signal, and transmit the same to the controller 166. The current obtained from the current sensor 150 and the temperature obtained from the temperature sensor 140 are also converted into digital signals and are transmitted to the controller 166. In addition, the switch driver 162 is configured to turn on and off the charge switch 120 and/or the discharge switch 130 in response to control signals from the controller 166. In some embodiments, the controller 166 controls the switch driver 162 based on information obtained from the temperature sensor 140, the current sensor 150, and the voltage sensor 161. In an exemplary embodiment, when the charged amount of the battery cell 110 is a fully charged amount (100% or P2), the controller 166 transmits a control signal to the switch driver 162 based on the charged amount calculation unit 163 signal to the controller 166 to turn off the charge switch 120. The switch driver 162 sends a signal to the charge switch 120 to turn off the charge switch 120 and interrupt charging. in some embodiments, if it is determined based on the information obtained from the current sensor 150 that overcurrent flows through the battery cell 110, the controller 166 transmits the control signal to the switch driver 162 to turn off the charge switch 120 or the discharge switch 130, as appropriate to correct the overcurrent condition. In some embodiments, if it is determined based on the information obtained from the voltage sensor 161 that the battery cell 110 is over-charged and/or over-discharged, the controller 166 transmits the control signal to the switch driver 162 to turn off the charge switch 120 or the discharge switch 130, as necessary. Based on the information obtained from the voltage sensor 161, the charged amount calculation unit 163 calculates the current charged amount of the battery cell 110. Information concerning the charged amount relative to the voltage of the battery cell 110 is stored in the storage unit 164.

As described above, the storage unit 164 may store the charged amount relative to the voltage of the battery cell 110, a present count corresponding to the number of interrupted charging counts, the first reference capacity P1, the second reference capacity P2 and the third reference capacity P3. The stored data is supplied to the controller 166 when necessary. In addition, the storage unit 164 may store a program or software for implementing the charging method shown in FIG. 1.

The timer 165 is configured to measure a charging time of the battery cell 110 and then transmit the measured charging time to the controller 166. The timer 165 may be configured by clocks incorporated into the MPU 160.

As described above, the controller 166 may drive the switch driver 162 based on the information obtained from the temperature sensor 140, the current sensor 150 and the voltage sensor 161. In some embodiments, the controller 166 may transmit the information indicating that the user uses the external electronic device 200 by directly connecting to the AC power source through the communication terminals C and D.

In the embodiment of the present invention, the voltage sensor 161 or the switch driver 162 is controlled by the controller 166 of the MPU 160. However, as the number of battery cells increases, a separate analog front end may be installed to control the voltage sensor 161 or the switch driver 162. Alternatively, the MPU 160 or the analog front end may be separately provided, or the MPU 160 and the analog front end may be implemented into a single chip.

Meanwhile, the external electronic device 200 includes a controller 210, a power supply unit 220, the AC adapter 230 and a load 240.

Based on battery use information, the controller 210 controls the power supply unit 220 through the communication terminals C and D of the battery pack 100. That is to say, the controller 210 controls the power supply unit 220 to perform forcible discharging of the battery cell 110. In general, when AC power is directly supplied to the power supply unit 220 through the AC adapter 230, the AC power is supplied to the load 240 of the external electronic device 200 and simultaneously to the battery cell 110. In some embodiments, as depicted, the current of the battery cell 110 cannot flow directly through the load 240.

In some embodiments, the power supply unit 220 includes a switch 221 provided at a location at which the AC adapter 230 is connected to the power supply unit 220. That is to say, the controller 210 turns off the switch 221, thereby interrupting the AC power supplied from the AC adapter 230. Accordingly, since the current of the battery cell 110 directly flows to the load 240, it is possible to forcibly discharge the battery cell 110 to reach a desired level of a charged amount.

Figure 3B:
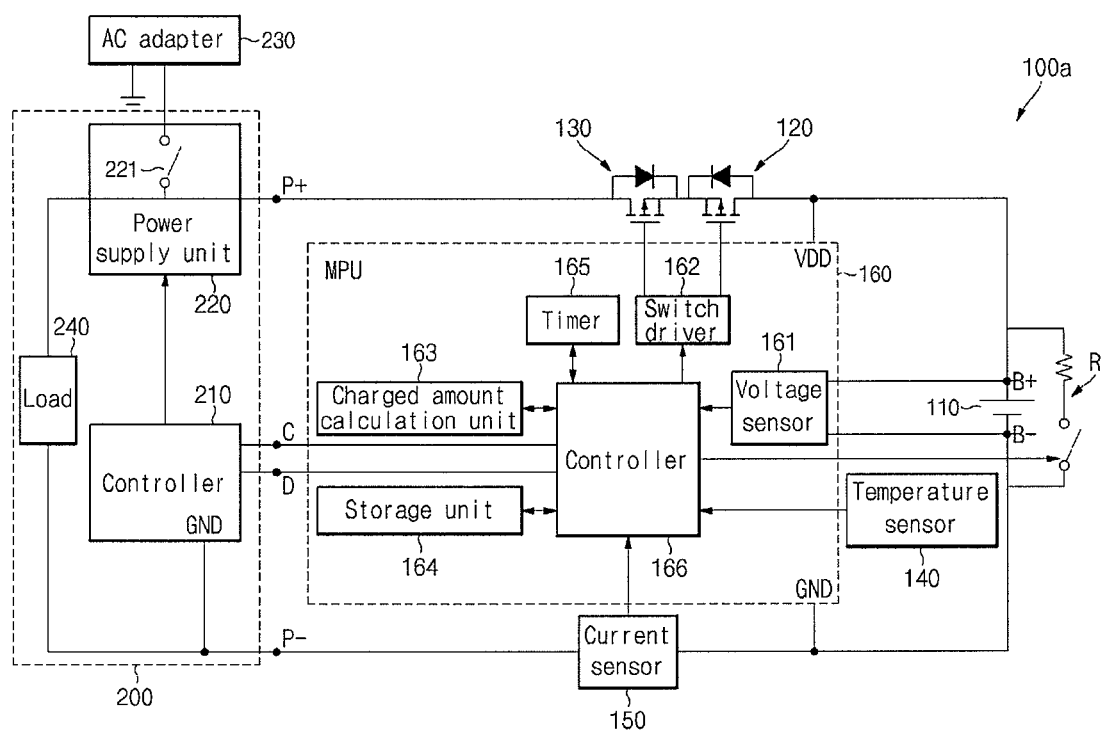
FIG. 3B is a block diagram of another embodiment of a battery pack.

FIG. 3B is a block diagram of a configuration of a battery pack according to another embodiment.

Referring to FIG. 3B, the battery pack 100a has a configuration similar to the battery pack 100 depicted in FIG. 3A. The battery pack 100a includes a resistor R connected in parallel with the battery cell 110.

In some embodiments, the resistor R may be connected to the battery cell 110 upon a signal from the controller 166. Resistor R may be formed of any material and shape capable of generating heat upon the flow of current. Therefore, when the user uses the external electronic device 200 by directly connecting to the AC power source, the controller 166 may connect the resistor R to the battery cell 110, so that the current of the battery cell 110 may be lost through the resistor R. The flow of current through the resistor R may be a self-discharge of the battery cell 110. In some embodiments, the resistor R may be connected to the battery cell 110 through a switch which is under the control of the controller 166. Therefore, the battery cell 110 can be forcibly discharged to reach a desired level of a charged amount. In addition, according to the present invention, the forcibly discharging of the battery cell 110 may be simultaneously performed with turning off the switch 221 of the power supply unit 220 and connecting the resistor R.

Although the present development has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A method for charging a battery comprising:
   determining whether a battery cell is fully charged;
   if the battery cell is fully charged, interrupting charging of the battery cell;
   determining whether the charged amount of the battery cell is equal to a first reference capacity;
   if the charged amount of the battery cell is equal to first reference capacity, incrementing a stored number of interrupted charging counts;
   determining whether the number of interrupted charging counts is equal to a preset number;
   if the number of interrupted charging counts is equal to the preset number, setting a fully charged amount of the battery cell to a second reference capacity; and
   discharging the battery cell down to the second reference capacity.

2. The charging method of claim 1, wherein the second reference capacity is set to be less than the first reference capacity.

3. The charging method of claim 1, further comprising:
   after discharging the battery cell until the charged amount of the battery cell reaches the second reference capacity, stopping discharging the battery cell;
   determining whether the charged amount of the battery cell is equal to a third reference capacity;
   if the charged amount of the battery cell is equal to the third reference capacity, determining whether the battery cell is chargeable;
   if the battery cell is chargeable, charging the battery cell to reach the second reference capacity;
   determining whether the charged amount of the battery cell is equal to the second reference capacity; and
   if the charged amount of the battery cell is equal to the second reference capacity, interrupting charging of the battery cell.

4. The charging method of claim 3, wherein the third reference capacity is less than the second reference capacity.

5. The charging method of claim 1, wherein the preset number is in a range from 3 to 10.

6. The charging method of claim 1, wherein discharging the battery cell comprises connecting the battery cell to an external electronic device.

7. The charging method of claim 6, wherein, while the battery cell is being charged, the external electronic device, the battery cell and an AC adapter are electrically connected to each other, and while the battery cell is forcibly discharged, the AC adapter is electrically disconnected from the external electronic device and the battery cell.

8. The charging method of claim 1, wherein discharging the battery cell comprises connecting the battery cell to a resistor.

9. The charging method of claim 3, wherein a difference between the fully charged amount of the battery cell and the first reference capacity is equal to a difference between the second reference capacity and the third reference capacity.

10. A battery pack comprising:
a battery cell;
a voltage sensor;
a current sensor, wherein the voltage sensor and the current sensor are configured to measure a charged amount of the battery cell; and
a controller controlling charging of the battery cell,
wherein if the battery cell is reduced to a first reference capacity, the controller is configured to interrupt charging of the battery cell and increment a stored number of interrupted charging counts, and if the number of interrupted charging counts is equal to a preset number, the controller is configured to set the fully charged amount of the battery cell to a second reference capacity, and discharge the battery cell down to the second reference capacity.

11. The battery pack of claim 10, wherein the second reference capacity is set to be less than the first reference capacity.

12. The battery pack of claim 10, wherein after the battery cell is discharged down to the second reference capacity, the controller is configured to interrupt discharging of the battery cell, and wherein if the charged amount of the battery cell is reduced to a third reference capacity the battery cell is charged to reach the second reference capacity.

13. The battery pack of claim 12, wherein the third reference capacity is set to be less than the second reference capacity.

14. The battery pack of claim 13, wherein if the measured charged amount of the battery cell is equal to the second reference capacity, the controller is configured to interrupt charging of the battery cell and lower the charged amount to the third reference capacity.

15. The battery pack of claim 10, wherein the preset number is in a range of 3 to 10.

16. The battery pack of claim 10, wherein the controller forcibly discharges the battery cell by connecting the battery cell to an external electronic device.

17. The battery pack of claim 16, wherein while the battery cell is being charged, the external electronic device, the battery cell and an AC adapter are electrically connected to each other, and the controller is configured to discharge the battery cell by transmitting a signal to the external electronic device to electrically disconnect the external electronic device and the AC adapter from each other.

18. The battery pack of claim 10, wherein the controller is configured to connect the battery cell to a resistor.

19. The battery pack of claim 13, wherein a difference between the fully charged amount of the battery cell and the first reference capacity is equal to a difference between the second reference capacity and the third reference capacity.

* * * * *